A. E. MOORE.
ATTACHMENT FOR PNEUMATIC TOOLS.
APPLICATION FILED JAN. 6, 1920.
1,360,136.
Patented Nov. 23, 1920.
2 SHEETS—SHEET 1.
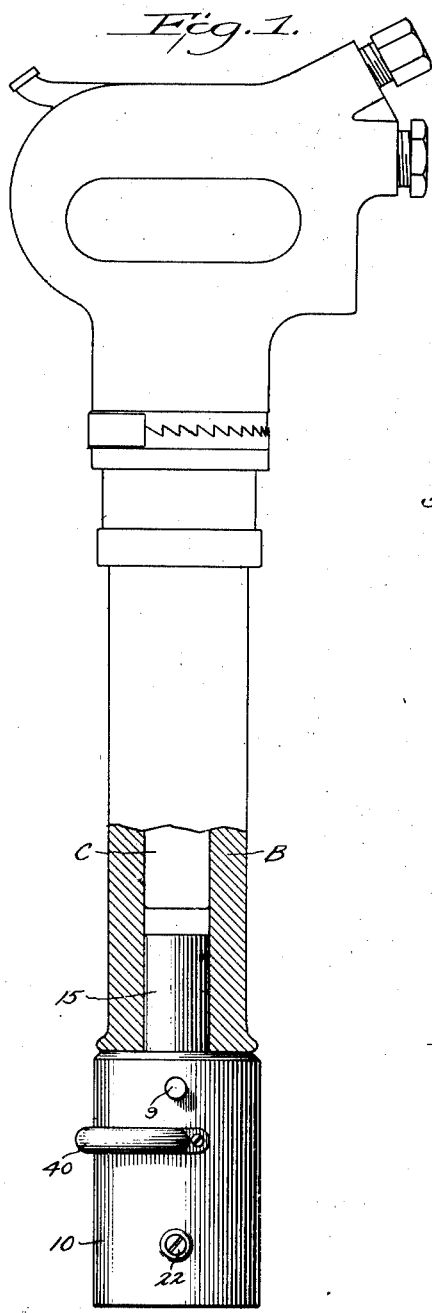
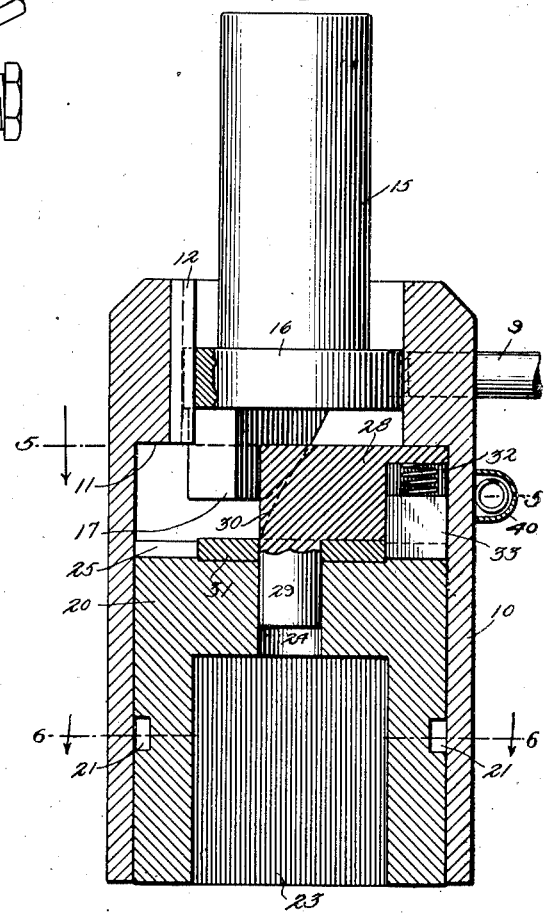
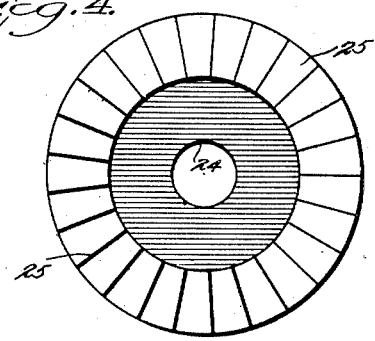
WITNESSES
INVENTOR
A. E. MOORE
BY
ATTORNEYS A. E. MOORE.
ATTACHMENT FOR PNEUMATIC TOOLS.
APPLICATION FILED JAN. 6, 1920.
1,360,136.
Patented Nov. 23, 1920.
2 SHEETS—SHEET 2.
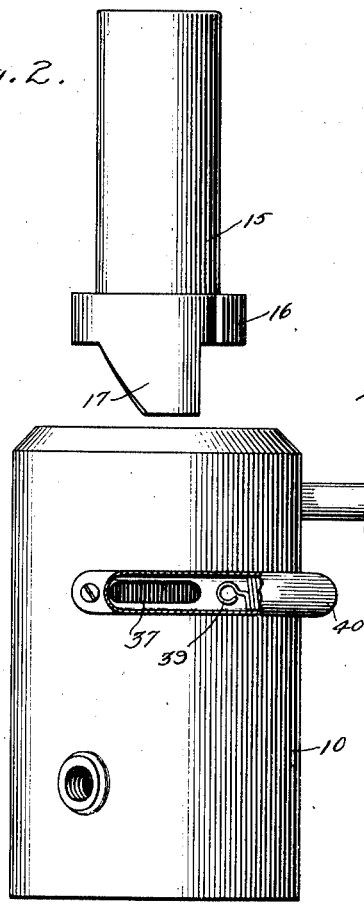
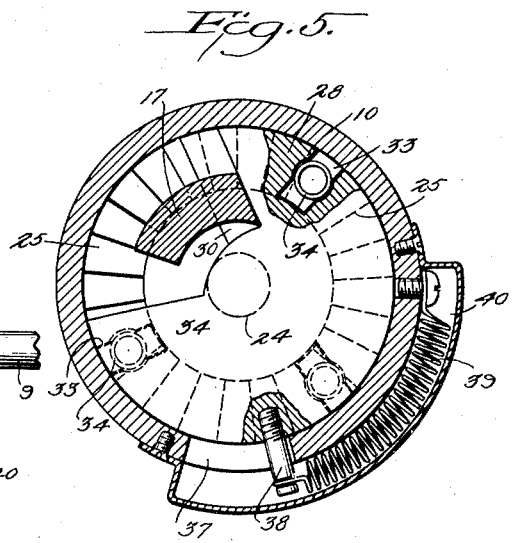
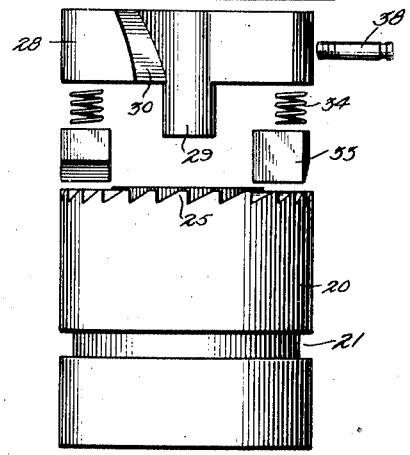
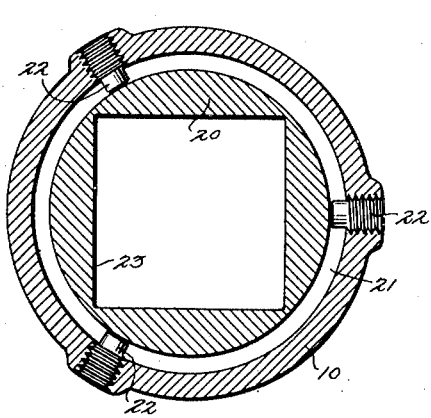
WITNESSES
INVENTOR
A. E. MOORE
BY
ATTORNEYS

UNITED STATES PATENT OFFICE.

AUGUSTUS EDWARD MOORE, OF BROOKLYN, NEW YORK.

ATTACHMENT FOR PNEUMATIC TOOLS.

1,360,136.     Specification of Letters Patent.     Patented Nov. 23, 1920.

Application filed January 6, 1920. Serial No. 349,691.

*To all whom it may concern:*

Be it known that I, AUGUSTUS E. MOORE, a citizen of the United States, and a resident of the city of New York, in the borough of Brooklyn, county of Kings, and State of New York, have invented a new and Improved Attachment for Pneumatic Tools, of which the following is a full, clear, and exact description.

This invention relates to tools, and more particularly to pneumatic or air-driven tools. The invention more specifically appertains to an attachment for use in connection with pneumatic tools such as hammers.

An object of the invention is to produce an attachment for use in connection with air-driven hammers or other pneumatic tools, in order that a pneumatic hammer may be put to increased service and use in connection with all manners of steel structural work and other uses to which pneumatic tools in general are subject.

In industries where pneumatic hammers are employed for riveting and driving work, it is often desirable to employ bolts for temporarily securing the parts together just prior to applying rivets to facilitate the erection of steel structural work and other building activities, to drill holes, operate reamers and other machine tools requiring rotation.

Heretofore it has been the custom to employ separate machine tools for tightening up nuts, drilling holes, operating reamers and other necessary machine work in order to carry on the work related with the operation of pneumatic tools. It would be greatly to the advantage of building engineers to have provided a single tool used in connection with pneumatic hammers for supplanting the several other tools generally used for carrying on the work.

It is fitting therefore, that the primary object of my invention is to provide an attachment tool which may be used in connection with pneumatic hammers for tightening up nuts, operating drills and reamers, and executing the various other kinds of work employed in building construction, and more particularly employed in steel erecting activities.

A further purpose is to provide a combination tool which may either be used for driving rivets and executing other work necessitating a hammering tool, or which may be used for rotating drills, reamers and other similar machine tools.

To this end, my invention has relation to a simplified form of attachment which is manufactured and either sold separately from, or as a part with pneumatic hammers and other air-driven tools in order that the reciprocating motion developed in an air-driven hammer may be transformed into rotary motion for operating drills, reamers and other machine tools.

With the above principal objects and others in view, the invention has relation to an attachment for air-driven tools and machinery, several variable modifications in design, construction and operation of which are set forth in the appended claims defining this invention, likewise described in the following specification, and one example of attachment tool which is portrayed in the accompanying drawings wherein:

Figure 1 illustrates the attachment shown in operable connection with a conventional type of pneumatic hammer.

Fig. 2 illustrates the attachment tool disassembled with the parts displayed in consecutive order as removed from the sleeve casing of the attachment tool.

Fig. 3 illustrates a longitudinal vertical sectional view of the attachment tool with the parts assembled in working order.

Fig. 4 shows a face view of a ratchet driven socket member removed from the sleeve.

Fig. 5 illustrates a sectional view taken transversely of the longitudinal axis of the attachment tool as developed on the plane of section 5—5 displayed in Fig. 3.

Fig. 6 shows a cross sectional view taken on the line 6—6 of Fig. 3.

An attachment tool for air-driven machines constructed and operated in accordance with the conception of my invention employs a sleeve casing having a plunger which is driven directly from the plunger of any pneumatic tool such as a hammer. A socket member is rotatably confined in the sleeve and is made to receive the head of a bolt or a nut in order that the nut may be rotated to run the nut down on the threads to secure parts together during structural operations. Likewise the socket member may receive a drill or other machine tool to impress rotation on the said machine tool for drilling or other cutting operations. A pawl cage is confined between the socket member and the plunger and functions to convert the reciprocating motion of the plunger into rotary motion impressed against the socket member.

In presenting a more detailed description of my invention, there is pointed out in the drawings a sleeve casing 10 preferably constructed in the form of a cylinder and open at each end. The sleeve casing is provided with a shoulder 11 which reduces the diametral bore at one end of the cylinder. There is a key 12 fixed in the bore of the cylinder parallel to the axis, or the key may in fact be termed a rib formed in the cylinder of the sleeve as an integral part to provide a more substantial and unitary structure, and further, to reduce the number of parts employed. A handle 9 is fixed to the casing 10 and is long enough to allow the operator to hold the attachment against rotation.

A plunger 15 is slidably mounted in the smaller bore of the sleeve and adapted to reciprocate therein. The plunger 15 is provided with an integral head 16, and this head has a channel cut to form the counterpart of the key or rib 12. The plunger 15 is subjected to short-stroke reciprocations and is constrained from rotation by the key 12. A driving cam 17 is made on the head 16 of the plunger 15 as an integral part thereof, the contour of the cam being cut on a curve to effectually deliver an angular impact against another cam as later described.

A socket member 20 is rotatably confined in the sleeve 10 and is revolved in the casing through the agency of a ratchet and pawl mechanism. This ratchet driven socket member 20 is provided with a groove 21 radially formed in the outer face thereof, and rotates on pins 22 confined in the groove 20. The pins may be threaded into the sleeve 10 as shown in the drawings or otherwise made permanently in the sleeve to form a composite structure to obviate the possibility of parts becoming loose due to the extremely heavy usage and service to which these tools are put. The inner end of the pins 22 are turned down to form a bearing to fit within the groove 21 to permit free rotation of the driven member 20 within the sleeve 10. The co-acting pins 22 and groove 21 function to constrain the ratchet driven socket member 20 from longitudinal movement. The driven member 20 is usually provided with a large opening or socket 23 to receive the head of a bolt, a nut, or other part to be rotated. One end of the socket driven member 20 is provided with a bore 24 concentric with the face of the socket member and acting as a bearing to journal another part as later described. The upper end of the socket driven member 20 is provided with ratchet teeth 25 milled on the end thereof.

A pawl cage 28 is confined in the sleeve and arranged to oscillate between the socket driven member 20 and the plunger head 16. The pawl cage has a journal 29 fitting into the bearing 24 which centers and holds it in proper working relation with the other parts. The pawl cage has a cam 30 which fits against the driving cam 17 of the plunger. The faces of the cams 17 and 30 lie in contact, and function to oscillate the pawl cage. The pawl cage 28 is made in the shape of a disk, but is not a full disk in that a portion thereof, or in fact a sector thereof, is removed from this part in order to provide adequate space for the driving cam 17. The driving cam 17 fits down into the open space adjacent the cam 30. It is seen therefore how the pawl cage 28 has a portion removed therefrom to form an open space for the reception of the cam 17, and that the pawl cage may undergo a limited oscillation relatively to the cam 17 while it occupies a position adjacent the cam 30.

A spacing washer 31 is interposed between the pawl cage and the socket driven member 20 to provide for and render more convenient the manufacturing conditions where it is necessary to cut or mill the teeth 25 in the part 20. There are a number of pawl sockets made in the pawl cage to retain pawls or ratchet teeth 33. The ratchet teeth 33 are inserted in sockets 32 with a compression spring 34 interposed between the tooth and the wall of the socket to normally impress the teeth 33 downwardly in engagement with the ratchet teeth 25 of the socket driven member 20. The parts just described, embodying the pawl cage, are limited against longitudinal motion by their confinement between the shoulder 11 and the end of the socket member 20, but are free to oscillate therebetween during the operation of the tool.

There is provided a slot 37 in the sleeve 10, and a pin 38 is passed through the slot and fixed in the pawl cage 28. A tension spring 39 has one end hooked to the pin and the other end fixed to the sleeve. The spring 39 is normally under tension which positively returns the pawl cage and ratchet teeth to a stopped and limited position at the end of each oscillating force impressed against the pawl cage. A cover 40 incloses the spring and oscillating pin 38 and is fixed to the sleeve 10 in any appropriate manner to cover and protect the spring.

In the operation of the attachment tool, as above described, it is placed in connection with the pneumatic hammer as shown in Fig. 1. A pneumatic hammer or air-driven tool of any similar class usually comprises a cylinder B with a driving plunger C which reciprocates in the cylinder to execute hammer blows against rivets or other work at hand. The plunger 15 is inserted in the cylinder B in line with the plunger C to receive the impacts of the pneumatic hammer plunger. The sleeve casing 10 is allowed to lie in position against the end of the cylinder B, and the operator holds to the handle 9 fixed to the sleeve to restrain the sleeve against rotation.

As the plunger 15 reciprocates in the sleeve 10 guided by the rib 12, the driving cam 17 rides forward over the face of the driven cam 30 to impress a force into the pawl cage 28 right-angular to the movement of the plunger 15. It is seen how the movement of the plunger is transformed into rotary motion or into oscillating motion of the pawl cage 28 through the agency of the co-acting cams 17 and 30. The oscillating pawl cage 28 undergoes a partial revolution each time the plunger 15 is reciprocated, and thus transmits a similar rotary motion to the socket member 20. When the impact of the pneumatic plunger C against the plunger 15 has terminated, the pressure on the cam 30 is relaxed and the tension spring 39 simultaneously returns the pawl cage 28 to normal position in readiness to receive the next impulse of the plunger.

The operator brings the attachment tool into engagement with the nut to be driven forward on a bolt by placing the socket 23 over the head of the nut and pressing the trigger of the pneumatic hammer to start the operation of the two tools to rotate the socket driven member 20, and at the same time exerts a gentle holding pull on the handle 9 to prevent the rotation of the sleeve 10.

Where it is necessary to operate drills, reamers, or in fact any other cutting tool, it is only necessary to provide a suitable chuck or adapter to be fitted into the socket 23 in order to rotate the chuck or adapter. The drill or any other tool may then be clamped into the chuck and subjected to rotation for drilling or reaming holes.

This attachment tool for air-driven machines, and more particularly for pneumatic hammers, will find a broad use in the field of engineering and building enterprises where it works a great inconvenience on mechanics and builders to be put, t othe necessity of providing a separate machine for executing individual operations. Its use in connection with pneumatic hammers is economical in that the attachment tool is quite inexpensive as compared to the nature of work of which it is capable.

Having thus described my invention, what I claim as new and desire to secure by Letters Patent is:

1. The combination with a tool of the character described including a cylindrical barrel and a reciprocating hammer, of an attachment therefor comprising a sleeve, a non-rotary reciprocating plunger having a portion extending outwardly therefrom adapted to be telescopically received by the cylindrical barrel, a rotary non-reciprocating head in said sleeve and means interposed between the plunger and head for rotating said head upon reciprocations of the plunger when actuated by the hammer.

2. An attachment for tools of the character set forth, comprising a sleeve, a non-rotary reciprocating plunger mounted therein, a non-reciprocating rotary head mounted therein, an oscillatory member interposed between the plunger and head, means on the member, means on the plunger adapted to co-act therewith to oscillate the member upon reciprocations of the plunger, and means on the member and head respectively, said latter means adapted to co-act with each other upon oscillations of the member for rotating the head.

3. An attachment for tools of the character set forth comprising a sleeve, a non-rotary plunger mounted therein for reciprocation, a rotary non-reciprocating head having ratchet teeth formed thereon, an oscillatory member interposed between the plunger and the head having pawls adapted to co-act with the ratchet teeth, and means on the plunger and the member respectively adapted to co-act to impart oscillatory motion to the member upon reciprocations of the plunger as and for the purpose set forth.

4. An attachment for tools of the character set forth comprising a sleeve, a non-rotary plunger mounted therein for reciprocation, a rotary non-reciprocating head having ratchet teeth formed thereon, an oscillatory member interposed between the plunger and the head having pawls adapted to co-act with the ratchet teeth, means on the plunger and the member respectively adapted to co-act to impart oscillatory motion to the member upon reciprocations to the plunger, and means for returning said member to normal position as and for the purpose specified.

5. An attachment tool used in connection with pneumatic hammers for the purpose of converting the hammer to uses such as tightening bolts, operating drills and reamers, said attachment tool comprising, a sleeve, a plunger slidably mounted in the sleeve, means employed to restrain the plunger from rotation, a socket member to connect with machine elements to be rotated, ratchet teeth formed on the socket member, a pawl cage interposed between the plunger and the socket member, pawls contained in the pawl cage to engage the ratchet teeth, and means associated with the plunger and pawl cage for subjecting said pawl cage to an oscillating motion through the reciprocating action of the plunger.

6. An attachment tool used in connection with pneumatic hammers for the purpose of converting the hammer to uses such as tightening bolts, operating drills and reamers, said attachment tool comprising, a sleeve, a plunger slidably mounted in the sleeve, means employed to restrain the plunger from rotation, a socket member to connect with machine elements to be rotated, ratchet teeth formed on the socket member, a pawl cage interposed between the plunger and the socket member, pawls contained in the pawl cage to engage the ratchet teeth, and an arrangement of cams interposed between the pawl cage and the plunger for transforming the reciprocating action of the plunger into an oscillating motion of the pawl cage for the purpose of rotating the socket member.

7. An attachment tool used in connection with pneumatic hammers for the purpose of converting the hammer to uses such as tightening bolts, operating drills and reamers, said attachment tool comprising, a sleeve, a plunger slidably mounted in the sleeve, means employed to restrain the plunger from rotation, a socket member to connect with machine elements to be rotated, ratchet teeth formed on the socket member, a pawl cage interposed between the plunger and the socket member, pawls contained in the pawl cage to engage the ratchet teeth, said pawl cage provided with a cam face, and a cam made on the plunger to drive against the cam of the pawl cage to oscillate the pawl cage to rotate the socket member.

8. An attachment tool used in connection with pneumatic hammers for the purpose of converting the hammer to uses such as tightening bolts, operating drills and reamers, said attachment tool comprising, a sleeve, a plunger slidably mounted in the sleeve, means employed to restrain the plunger from rotation, a socket member to connect with machine elements to be rotated, ratchet teeth formed on the socket member, a pawl cage interposed between the plunger and the socket member, pawls contained in the pawl cage to engage the ratchet teeth, said pawl cage provided with a cam face, a cam made on the plunger to drive against the cam of the pawl cage to oscillate the pawl cage to rotate the socket member, and a means employed for returning the pawl cage to normal inoperative position ready to receive the next blow of the plunger.

9. An attachment tool used in connection with pneumatic hammers for the purpose of converting the hammer to uses such as tightening bolts, operating drills and reamers, said attachment tool comprising, a sleeve, a plunger slidably mounted in the sleeve, means employed to restrain the plunger from rotation, a socket member to connect with machine elements to be rotated, ratchet teeth formed on the socket member, a pawl cage interposed between the plunger and the socket member, pawls contained in the pawl cage to engage the ratchet teeth, said pawl cage provided with a cam face, a cam made on the plunger to drive against the cam of the pawl cage to oscillate the pawl cage to rotate the socket member, and a spring connected with the pawl cage and sleeve for the purpose of returning said cage to position the cam face thereof in line with the cam on the plunger.

10. An attachment tool for use in connection with air-driven machinery, comprising a sleeve, a handle fixed to the sleeve, a plunger slidably mounted in the sleeve, a head made on the plunger, said head having a groove formed therein, a rib fixed in the sleeve and confined in the groove of the aforesaid head, a driving cam made on the head, a driven cam confined in the sleeve to undergo oscillation due to the force of the driving cam, a journal made on the driven cam, ratchet teeth carried by the driven cam, a device rotatably confined in the sleeve and driven by the ratchet teeth of the driven cam and having a bearing to receive the aforesaid journal, and said device having means for connection with any machine element to be rotated.

11. An attachment tool for use in connection with air-driven machinery, comprising a sleeve, a handle fixed to the sleeve, a plunger slidably mounted in the sleeve, a head made on the plunger, said head having a groove formed therein, a rib fixed in the sleeve and confined in the groove of the aforesaid head, a driving cam made on the head, a driven cam confined in the sleeve to undergo oscillation due to the force of the driving cam, a journal made on the driven cam, ratchet teeth carried by the driven cam, a device rotatably confined in the sleeve and driven by the ratchet teeth of the driven cam and having a bearing to receive the aforesaid journal, and said device having a socket for the reception of any machine element to be rotated.

12. An attachment tool for converting pneumatic hammers into additional uses such as tightening bolts, rotating reamers and drills, and for turning other machine elements, said attachment tool comprising a sleeve, a plunger slidably mounted in the sleeve adapted to receive impacts from a pneumatic hammer, a driving cam made on the plunger, a rotatable socket member confined in the sleeve, a driven cam confined between the socket member and plunger, a journal means related with the driven cam for holding the driven cam concentrically with the plunger, and a ratchet means interposed between the driven cam and the socket member for transmitting the oscillations of the driven cam into rotary motion of the socket member.

13. An attachment tool for converting pneumatic hammers into additional uses such as tightening bolts, rotating reamers and drills, and for turning other machine elements, said attachment tool comprising a sleeve, a plunger slidably mounted in the sleeve adapted to receive impacts from a pneumatic hammer, a driving cam made on the plunger, a rotatable socket member confined in the sleeve, a driven cam confined between the socket member and plunger, a journal means related with the driven cam for holding the driven cam concentrically with the plunger, and means interposed between the socket member and the driven cam for subjecting the socket member to revolution when the plunger works against the driven cam.

14. An attachment tool for converting pneumatic hammers into additional uses such as tightening bolts, rotating reamers and drills, and for turning other machine elements, said attachment tool comprising a sleeve, a plunger slidably mounted in the sleeve adapted to receive impacts from a pneumatic hammer, a driving cam made on the plunger, a rotatable socket member confined in the sleeve, a driven cam confined between the socket member and plunger, a journal means related with the driven cam for holding the driven cam concentrically with the plunger, means interposed between the socket member and the driven cam for subjecting the socket member to revolution when the plunger works against the driven cam, and a spring employed to return the driven cam to normal position in line with the plunger when the plunger retracts for the next stroke.

AUGUSTUS EDWARD MOORE.